United States Patent Office 3,615,016
Patented Oct. 26, 1971

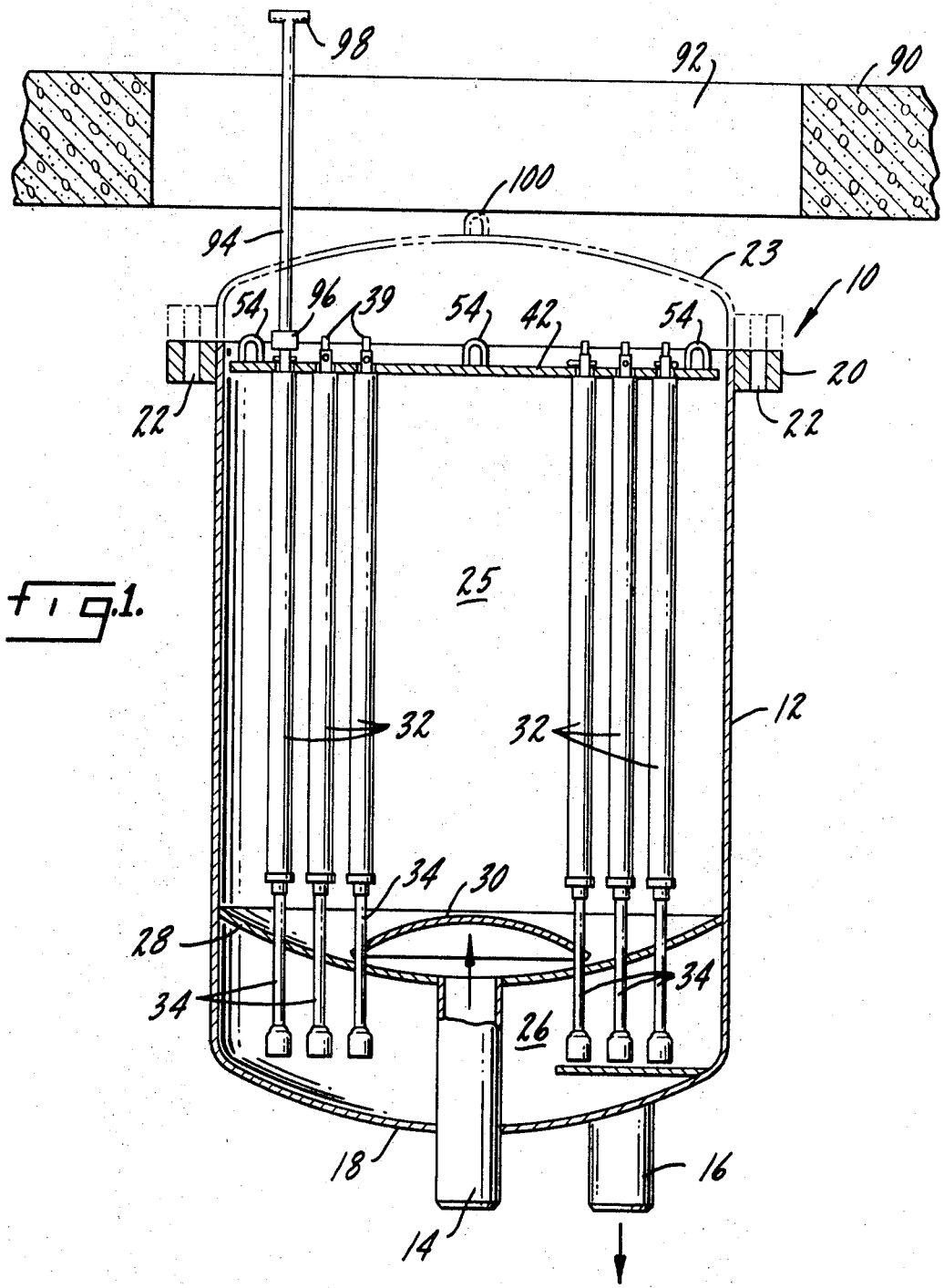

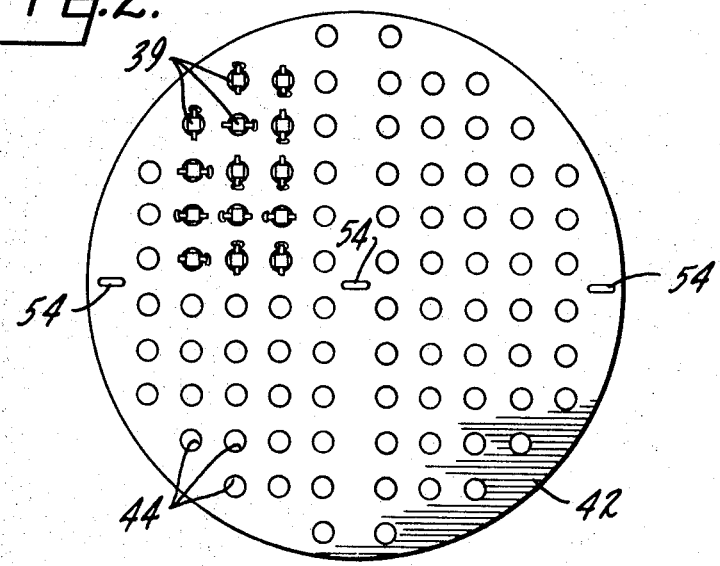
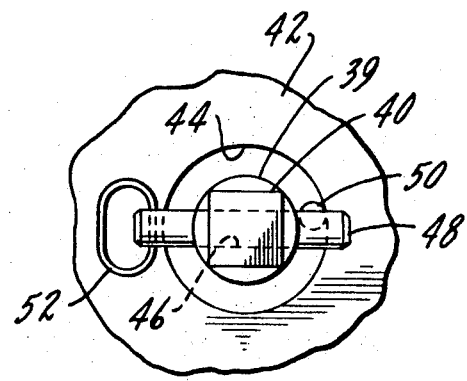
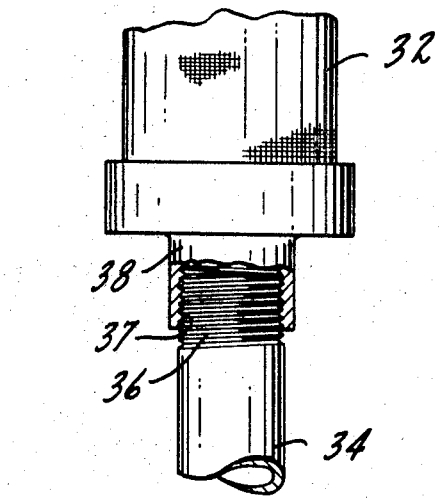
INVENTORS.
ALFONSE J. SORIENTE
STANLEY H. WAPNER
BY Hume, Clement, Hume & Lee
Attorneys.

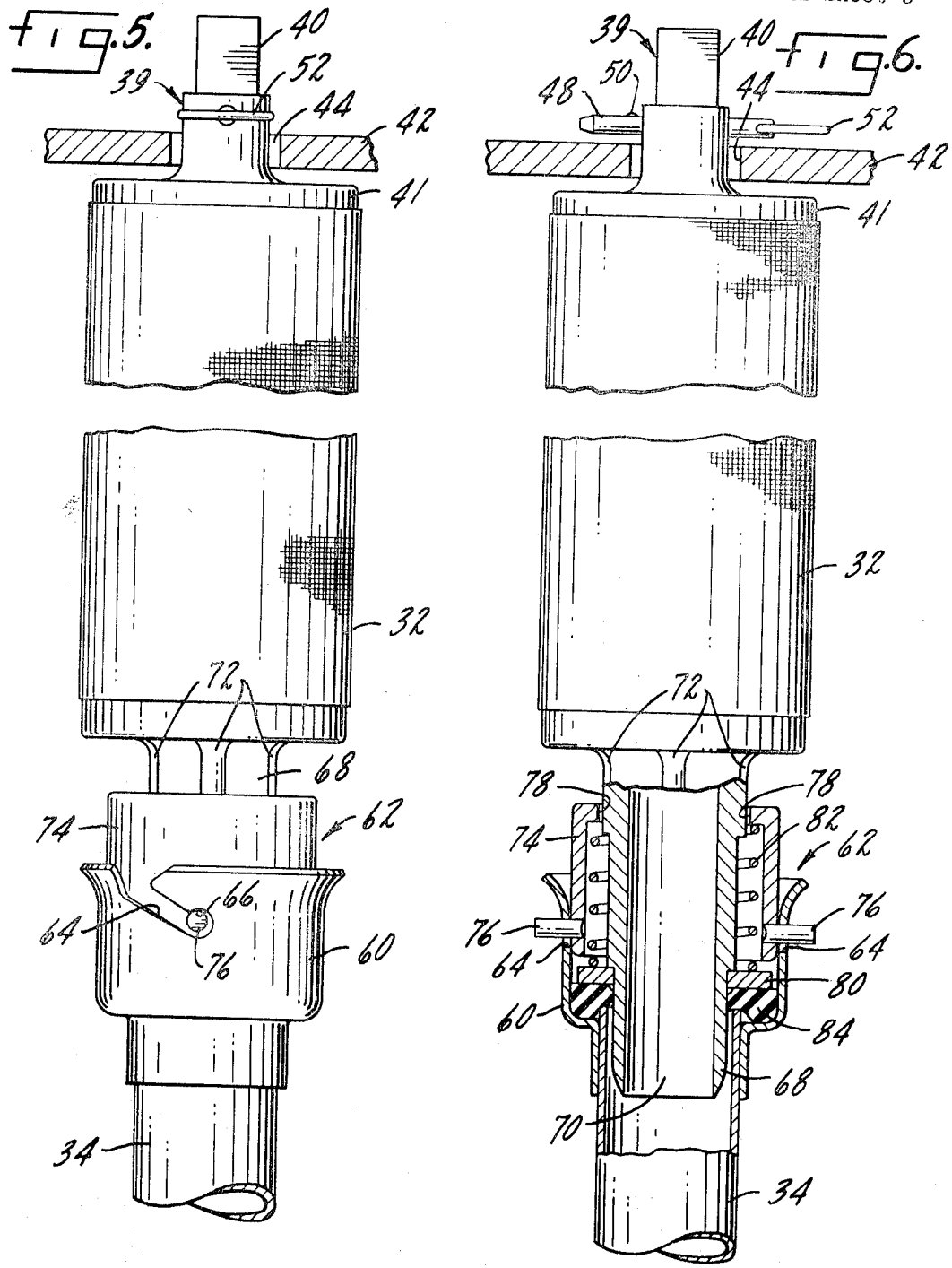

3,615,016
FILTER TANK HAVING REPLACEABLE FILTER CARTRIDGES
Alfonse J. Soriente, Gillette, N.J., and Stanley H. Wapner, New York, N.Y., assignors to Ecodyne Corporation, Chicago, Ill.
Filed Oct. 3, 1968, Ser. No. 764,874
Int. Cl. B01d 25/02
U.S. Cl. 210—232
17 Claims

ABSTRACT OF THE DISCLOSURE

Apparatus enabling remote removal of a plurality of annular filter cartridges from a tank includes a wrenching portion on top of each cartridge, enabling it to be easily turned and unseated by an operator outside the tank. A cartridge locating plate having a plurality of apertures is positioned to fit over the wrenching portions, while permitting them to be rotated. Each wrenching portion includes release means which prevent the cartridge from dropping from the plate, so that the plate and cartridges may be lifted together and removed from the tank. The release means permit the easy removal of the cartridges from the plate after removal from the tank. The filter cartridges may be screw-mounted on the seat means, or novel mounting means may be employed. These novel mounting means include a cartridge receiver on top of the seat means, and having a cam slot, together with upwardly biased cam follower means on the bottom of the filter cartridge.

---

The present invention relates to an improved apparatus enabling the remote removal of a plurality of annular filter cartridges from a tank, and to improved cartridge mounting means adapted for use therein.

Filter tanks having replaceable filter cartridges are well known in the art. An exemplary filter tank with filter cartridges is described in U.S. Pat. No. 3,279,608 to Sorient et al., issued Oct. 18, 1966, and assigned to the assignee of the present application. When the filter cartridges are removed or installed, personnel must ordinarily reach into the tank in order to handle them. This usually is not hazardous, but when the apparatus is used to filter liquids containing toxic and/or radioactive substances it is dangerous for personnel to enter the tank or to be in close proximity to the filter cartridges. In such instances, the personnel must have means for removing the exhausted cartridges from a position outside the tank. In the case of radioactive substances, removal is preferably carried out from a position that it not dangerously close to the tank, and, where the radiation level is high, removal should be performed from behind a suitable shield.

While apparatus have been developed for the remote removal of cartridges from a filter tank, they are often cumbersome and expensive. In addition, many such apparatus have required the use of highly specialized tools which are not readily available.

Generally, the present invention relates to improvements in a filter tank of the type having first and second end portions, an internal plate mounted in the second end portion, a plurality of annular cartridge seat means having first and second ends and supported by the internal plate, and a plurality of replaceable annular filter cartridges, also having first and second ends. In the present invention, the tank is provided with a fully removable head on the first end portion, and the filter cartridges each have a wrenching projection fixedly mounted on the first end, projecting axially therefrom. A cartridge locating plate is positioned over the wrenching projections. The locating plate has apertures which are adapted to permit rotation of the wrenching projections. The wrenching projections have release means which are engageable to prevent the filter cartridges from dropping from the locating plate when it is lifted, thus enabling the removal of all of the cartridges at once when the locating plate is removed. The second end of each filter cartridge and the first end of the seat means carry cooperating mounting means for attaching the cartridges to the seat means when they are rotated in one direction, and for disengaging the cartridges from the seat means when they are rotated in the opposite direction. In a simple form mounting means may comprise a simple tube with screws threads mounted on the end of each filter cartridge and cooperating screw threads on the first end of each seat means.

The present invention also provides novel mounting means which enable the filter cartridges to be securely mounted with only a relatively small amount of turning in one direction, and to be disengaged with a similarly small turn in the opposite direction. Generally, these mounting means comprise a receiver on the first end of each seat means, the receiver having a cam slot which is open at the end and angled toward the mounting means. Each filter cartridge carries a mounting assembly which is engageable with the cartridge receiver. The mounting assembly comprises a tube fixedly mounted on the end of the cartridge, substantially coaxially therewith. The tube carries a sleeve slidably mounted on it, and means are provided to prevent rotational movement of the sleeve relative to the cartridge. The sleeve has a cam follower pin which projects outwardly from its side and is adapted to follow the aforementioned cam slot when the sleeve and cartridge are rotated. Resilient means are also provided which bias the sleeve toward the cartridge and away from the seat means. It can therefore be seen that, after the cam it guided into the cam slot, when the cartridge is rotated the sleeve will be forced toward the seat means, thus engaging the cartridge.

While the above-described mounting means are particularly adapted for use with the remote removal means of the present invention, they are also useful in facilitating the installation and removal of cartridges where it is permissible for personnel to closely approach or even enter the filter tank.

The invention, both as to its organization and method of operation, taken together with the objects and advantages thereof, will be best understood by reference to the following detailed description, taken in conjunction with the accompanying drawings, in which:

FIG. 1 is a simplified cross-sectional view of a filtering device embodying the features of the present invention;

FIG. 2 is a plan view of the locating plate and filter cartridges of the present invention;

FIG. 3 is a fragmentary plan view of a single filter cartridge mounted in the apparatus;

FIG. 4 is an elevation view of a single filter cartridge and seat means, illustrating the manner in which the filter cartridge may be screw-mounted on the seat beams;

FIG. 5 is an elevation view of a single filter cartridge and seat means, illustrating the novel mounting means of the present invention; and FIG. 6 is an elevation view similar to FIG. 5, partially in section to illustrate the interior details of the cartridge mounting means.

Referring to the drawings, and more particularly to FIG. 1, a filtering device embodying the features of the present invention is generally indicated by reference numeral 10. The filtering device 10 is adapted to receive an influent stream, filter the influent stream, and discharge the filtrate or effluent stream. To these ends, the filtering device comprises a filter tank 12 having an inlet or influent line 14 and an outlet or filtrate line 16. The filter tank 12 is a generally cylindrical vessel made of steel or the like and having an outwardly convex bottom 18. The top of the tank 12 carries an external mounting ring 20 having bolt receiving apertures 22. During operation, the tank 12 is closed by a fully removable head 23, shown by phantom lines, mounted to the mounting ring 20 by bolts (now shown) penetrating the bolt receiving apertures 22 and aligned apertures in the head 23.

The tank 12 is divided into an influent zone 25 and a filtrate zone 26 by a downwardly convex tube sheet plate 28 suitably secured to the interior of the tank 12 by welding or the like. The inlet line 14 extends through the bottom 18 of the tank 12 and communicates with the influent zone 25 so that all of the influent stream is passed directly to the influent zone 25. The inlet pipe 14 is attached to the tube sheet plate 28 by welding or the like. In this manner, direct communication between the influent zone 25 and the filtrate zone 26 is precluded.

The influent stream from the inlet line 14 is dispersed as it enters the influent zone 25 by a distributor plate 30 having an upwardly convex configuration. The distributor plate 30 is mounted within the influent zone 25 in alignment with the inlet pipe 14 by suitable means, not shown in the drawings. As the influent stream enters the influent zone 25 it strikes the distributor plate 30 and is distributed radially outwardly of the distributor plate 30. In this manner, the influent stream is distributed substantially uniformly over the influent zone 25.

Mounted within the influent zone 25 are a plurality of filter cartridges 32 through which the influent stream must pass before entering the filtrate zone 26 and being discharged from the filter tank 12 through the outlet line 16. The filter cartridges 32 are annular-shaped filter elements. In the embodiment shown, they are perforated stainless steel elements covered with a layer of coarse screen and overlaid with a layer of fine screen. As is well known in the art, similar elements may be employed wherein nylon or other natural or synthetic fibers are substituted for the screen in the embodiment shown. Each of the filter cartridges 32 is mounted within the tank 12 by means hereinafter described. For simplicity, only six such cartridges 32 are shown in FIG. 1. As those skilled in the art will appreciate, the tank 12 will normally contain a much larger number of cartridges 32. As indicated in FIG. 2, these cartridges are spaced throughout most of the interior of the tank 12.

The tube sheet plate 28 has attached thereto cartridge seat means 34 for each filter cartridge 32 in the tank 12. Each of the cartridge seat means comprises an annular pipe made of steel or the like which extends through a hole in the tube sheet plate 28 and is attached thereto by welding or other suitable means. Each cartridge seat means 34 is substantially parallel to the longitudinal axis of the filter tank 12 and provides communication between the influent zone 25 and the filtrate zone 26.

As shown in FIG. 4, the simple mounting means which is adapted for use in the present invention comprises screw threads 36 on the upper end of the cartridge seat means 34. These screw threads 36 engage internal threads 37 in a mounting tube 38 mounted on the bottom of each filter cartridge 32, so that a tight fit is formed when the cartridges 32 are mounted on the seat means 34.

As shown in FIGS. 1-4, each of the filter cartridges 32 has a wrenching projection 39 on its upper end. These wrenching projections 39 are axially aligned with the remainder of the filter cartridges 32, and have a maximum diameter smaller than the diameter of the top of the filter cartridge body. As shown in the drawings, the top portions of these wrenching projections 39 have wrench flats 40 forming a square cross-sectional configuration. Of course, any configuration is suitable so long as it enables the wrenching projections 39 to be turned with a wrench. As shown is FIG. 4, the wrenching projections 39 are affixed to the top of caps 41, and the caps are mounted at the tops of the cartridges 32 by welding or the like.

When the filter cartridges 32 are mounted in the tank 12, their upper ends are properly located by a locating plate 42. As shown most clearly in FIG. 2, the locating plate 42 is a circular plate, having a diameter slightly smaller than the internal diameter diameter of the filter tank 12, and having a plurality of spaced apertures 44 corresponding to the positions of the filter cartridges 32. The apertures 44 are preferably circular, and are large enough to permit the rotation of the wrenching projections 39. These apertures 44 are of a size intermediate between the maximum diameter of the wrenching projections 39 and the top of the main portion of the filter cartridge 32 so that the locating plate may normally rest upon the filter cartridges 32 as shown in FIG. 1.

As best shown in FIGS. 3 and 4, each of the wrenching projections 39 includes release means which prevent the filter cartridge 32 from dropping from the locating plate 42 when the plate 42 is lifted. In the preferred embodiment, these release means include a transverse aperture 46 which fully penetrates each wrenching projection 39 in a direction transverse to the axis of the filter cartridge 32. The transverse apertures 46 each receive a quick release pin 48 having a partially recessed, spring-biased ball 50 mounted adjacent to one end and a gripping loop 52 at the opposite end. The spring-biased ball normally retains the quick release pin 48 properly located in the transverse aperture 46. As shown in FIGS. 3 and 4, the quick release pin 48 has a length greater than the diameter of the spaced apertures 44 in the locating plate 42. This insures that the cartridges 32 will not fall from the plate 42 when the plate 42 is lifted.

As shown in FIGS. 1 and 2, the locating plate 42 includes means for gripping and lifting it from the tank 12. In the embodiment shown, these gripping means comprise three lifting lugs 54 mounted on top of the locating plate 42 by welding or the like. These lugs 54 may be easily engaged by a suitable hook-shaped tool (not shown) to remove the locating plate 42 and cartridges 32 from the tank 12, as hereinafter described.

Referring to FIGS. 5 and 6, there are illustrated improved mounting means which permit the rapid and secure mounting of filter cartridges 32 on seat means 34. These mounting means are made up of two cooperating sections, a cartridge receiver 60 affixed to the top end of the cartridge seat means 34 and a cartridge mounting assembly affixed to the bottom end of the filter cartridge 32, generally indicated by reference numeral 62. The mounting assembly 62 is engageable with the cartridge receiver 60, as hereinafter described. In the preferred embodiment, the cartridge receiver 60 forms a shield, which is annular in shape, flared outwardly at the top. The cartridge receiver 60 is secured to the top of the seat means 34 by screw threads, welding, or the like. As shown in FIG. 5, the cartridge receiver has a cam slot 64 which is open at the top end of the receiver 60, and is angled downwardly toward the mounting means. The end of the cam slot 64 preferably includes a retention portion 66 which is angled upwardly, away from the mounting means 34. The retention portion 66 serves to retain the cartridge 32 mounted on the seat means 34, although its angle is not so sharp as to prevent disengagement of the cartridge receiver 60 and mounting assembly 62 as hereinafter described.

In the preferred embodiment, a pair of identical, oppositely disposed cam slots 64 is employed. These slots 64 are shown in section in FIG. 6, which illustrates the mounting means and filter cartridge 32 rotated 90° as compared to FIG. 5.

Referring to FIG. 6, the mounting assembly 62 includes a tube 68 fixedly mounted to the bottom of the cartridge 32, and axially aligned therewith. The tube 68 has a central conduit 70 which communicates with the interior of the filter cartridge 32. The exterior of the tube 68 carries a plurality of splines 72. A sleeve 74 having a cam follower pin 76 is slidably mounted on the tube. In the preferred embodiment, where a pair of cam slots 64 is employed, the sleeve 74 has a pair of aligned, oppositely disposed cam follower pins 76, as shown in FIG. 6. The sleeve 74 carries slots 78 which fit over the splines 72 to prevent the rotational movement of the sleeve 74 relative to the cartridge 32 and tube 68, while permitting longitudinal sliding movement thereof.

In the preferred embodiment, a spring retainer ring 80 is fixedly mounted on the tube 68 by welding or the like. The spring retainer ring 80 is positioned so that the sleeve 74 is slidable between the cartridge 32 and the spring retainer ring 80. A helical spring 82 is positioned between the sleeve 74 and the tube 68. The spring 82 abuts the spring retainer ring 80, and biases the sleeve 74 in an upward direction away from the spring retainer and toward the top of the cartridge. The underside of the spring retainer ring 80, opposite the spring 82, carries a gasket 84 of rubber, nylon, or the like, which forms a seal with the top of the seat means 34 when the mounting assembly 62 engages the cartridge receiver 60.

To mount the cartridge 32 on the seat means 34 with the mounting means illustrated in FIGS. 5 and 6, it is simply necessary that the cartridges 32 be positioned so that the cam follower pins rest on top of the cartridge receivers 60. Each cartridge 32 is then mounted by rotating the wrenching projection 39 slowly in a given direction (counter-clockwise in the embodiment shown) until the cam follower pins drop into the cam slots 64. As rotation of the cartridge 32 is continued, the cam follower pins 76 will follow the cam slots 64 in a downward direction, moving the sleeve 74 downward, and compressing the spring 82. When the cam follower pins 76 reach the retention portions 66 of the cam slots 64, further rotation of the cartridge 32 will not be permitted, and the cartridge will then be properly mounted.

It will be appreciated that a particular advantage of this mounting means is that it is not necessary to be careful about properly starting screw threads. Instead, the mounting assembly 62 will locate itself and permit a secure mounting in a minimum of time. For this reason, the cartridge receiver 60 and mounting assembly 62 of the present invention are well adapted to any apparatus wherein it is desired to mount filter cartridges on seat means, but is particularly adapted to the filter tank illustrated in the present invention, where rapid handling of cartridges is especially important.

To remove a cartridge 32 from the tank 12, the reverse of the above-described procedure is employed. That is, the cartridge 32 is simply rotated in the opposite direction (clockwise, in the embodiment shown) so that the cam follower pins 76 disengage themselves from the retention portions 66 of the cam slots 64, and follow the cam slots 64 in an upward direction away from the seat means 34, eventually disengaging the cartridge 32 from the seat means 34 when the cam follower pins 76 reach the ends of the slots 64.

The apparatus shown in the drawings is designed to be suitable for use in filtering liquids containing radioactive materials. To this end, as shown in FIG. 1, a radiation shield 90, of concrete or the like, is located above the tank 12. The radiation shield 90 has an aperture 92 which permits the removal of the tank head 23 and subsequent removal of the cartridges 32. FIG. 1 also shows a suitable wrench 94 fitted over one of the wrenching projections for unseating a cartridge 32. The wrench 94 has a socket portion 96 on one end and a handle 98 on the opposite end.

In normal operation, a pre-coat layer of filter medium, for example finely divided ion exchange resin particles in the range of about 60–400 mesh, will be deposited on the outside surfaces of the filter cartridges 32. A suitable pre-coating procedure is described in U.S. Pat. Nos. 3,377,270, issued Apr. 9, 1968 and 3,373,104, issued Mar. 12, 1968, both of which are assigned to the assignee of this application. A stream of liquid to be filtered, such as condensate water from a nuclear power plant, is fed into the apparatus 10 through the inlet line 14. The liquid is distributed by the distributor plate 30 as it enters the influent zone 25. The liquid then enters the filter cartridge 32, where it is filtered, exiting from the bottom of the cartridge seat means 34 into the filtrate zone 26. The filtered liquid then leaves the tank 12 through the outlet line 16.

Periodically, the apparatus may be backwashed to clean the filters. Suitable procedures are described in U.S. Pat. No. 3,373,104 to Ryan, issued Mar. 12, 1968, and in copending application Ser. No. 768,580, filed Aug. 30, 1968, both of which are assigned to the assignee of this application. After a time, it becomes necessary to remove and replace the filter cartridges 32.

In carrying out the removal process in accordance with the present invention, the tank 12 is drained of all liquid, and the head 23 is removed and withdrawn through the opening 92 in the radiation shield 90. This may be easily accomplished by engaging a suitable lifting lug 100 on top of the removable head 23.

After the head 23 has been removed, each of the cartridges 32 is unseated. This is accomplished by fitting the wrench 94 over the wrenching portion 39 of each filter cartridge 32 and turning it to fully unseat it. Where the filter cartridges are screw-mounted as illustrated in FIG. 4, a number of turns will be required to fully unseat each cartridge. On the other hand, where the improved mounting means shown in FIGS. 5 and 6 is employed, each cartridge may generally be unseated with less than a full turn. Where many cartridges are involved, this will very substantially reduce the time required to perform the unseating procedure. Where the filter tank is very large, it may be necessary to place a temporary catwalk (not shown) across the radiation shield 90 in order that an operator may unseat the cartridges 32 near the center of the tank. Although the operator is not protected by the radiation shield 90 during this operation, he is nevertheless relatively distant from the cartridges 32, and any hazard is therefore minimized. Of course, if radiation levels are high, the operation can be performed by remote control.

After all of the cartridges 32 have been unseated, the lifting lugs 54 on the locating plate 42 are engaged by a suitable gripping device (not shown), and the locating plate 42 and cartridges 32 are all lifted from the tank. This operation may also be accomplished from a position remote from the tank 12, as, for example, by utilizing a motorized winch to lift the plate 42 and cartridges 32.

If radiation levels are too high for personnel to safely approach the cartridges 32, the plate 42 and cartridges 32 are transferred to a decontamination station prior to removal from the plate. In most cases, such decontamination will not be necessary, since only a brief exposure to the cartridges 32 is required to remove them from the plate 42. In removing the cartridges 32 from the plate 42, the quick release pins 48 are simply pulled from the wrenching projections 39 by grasping the gripping loops 52 and pulling the pins 48 out of the transverse apertures 46 in the wrenching projections 39.

Since the radiation levels will be very low, an operator may enter the tank 12 and individually reinstall each of the elements 32. Again, when the elements are screw-mounted, each must be screwed into place, while when the improved mounting means described herein are employed, each cartridge may be rapidly mounted as described. Subsequently, the locating plate 42 is placed on top of the cartridges 32, and the quick release pins 48 are inserted. After the removable head 23 has been attached to the tank 12, the apparatus is again ready for operation.

Obviously, many modifications and variations of the present invention as hereinbefore set forth will occur to those skilled in the art, and it is intended to cover in the appended claims all such modifications and variations as fall within the true spirit and scope of the invention.

We claim:

1. In a filter tank of the type having first and second end portions, an internal plate mounted in said second end portion, a plurality of annular cartridge seat means having first and second ends, said seat means supported by said plate, said first ends of said seat means spaced from aid plate toward aid first end portion of said tank, and a plurality of replaceable annular filter cartridges having first and second ends, the improvement comprising: a fully removable head on said first end portion of said tank; wrenching projections fixedly mounted on said first ends of said filter cartridges and projecting axially therefrom; a cartridge locating plate having a plurality of apertures positioned to fit over said wrenching projections and adapted to permit rotation of said wrenching projections; release means in said wrenching projections, said release means being engageable to prevent said filter cartridges from dropping from said locating plate when said plate is lifted; and cooperating cartridge mounting means on said first end of said seat means and said second end of said filter cartridge, said mounting means adapted for attachment of said cartridges to said seat means when said cartridges are rotated in one direction and to disengage said cartridges from said seat means when said cartridges are rotated in the opposite direction.

2. The apparatus as defined in claim 1 wherein said cartridge mounting means comprise screw threads on said second ends of said filter cartridges and cooperating screw threads on said first ends of said mounting means.

3. The apparatus as defined in claim 2 further including a radiation shield located above said filter tank, said shield having an aperture large enough to permit the simultaneous removal of said locating plate and said cartridges from said tank.

4. The apparatus as defined in claim 2 wherein said wrenching projections each have a transverse aperture, and wherein said release means comprise pins adapted to penetrate said apertures.

5. The apparatus as defined in claim 4 wherein said pins each have a gripping loop on one end.

6. The apparatus as defined in claim 1 wherein said cartridge mounting means comprise cartridge receivers having first and second ends, said second ends of said cartridge receivers mounted on said first ends of said seat means, and said cartridge receivers each having a cam slot open at said first end of said cartridge receiver and angled toward said mounting means; and a mounting assembly on said second end of said filter cartridge and engageable with said cartridge receiver, said assembly comprising a tube fixedly mounted on said cartridge and coaxially aligned therewith; a sleeve slidably mounted on said tube; means for preventing rotational movement of said sleeve relative to said cartridge; a cam follower pin projecting outwardly from the side of said sleeve, said pin adapted to follow said cam slot when said sleeve and said cartridge are rotated; and resilient means biasing said sleeve toward said first end of said cartridge.

7. The apparatus as defined in claim 6 wherein said cam slot includes a retention portion angled away from said mounting means.

8. The apparatus as defined in claim 7 wherein said mounting assembly further includes a spring retainer ring fixedly mounted on said tube and positioned so that said sleeve is slidable betweed said retainer ring and said cartridge, and wherein said resilient means comprises a helical spring positioned between said sleeve and said tube and abutting said spring retainer ring.

9. The apparatus as defined in claim 8 wherein said cartridge receiver is annular in shape and flared outwardly at said first end.

10. The apparatus as defined in claim 9 further including a gasket mounted on said spring retainer ring opposite said spring, said gasket adapted to form a seal with said seat means when said mounting assembly engages said cartridge receiver.

11. In a filter tank having first and second end portions, an internal plate mounted in said second end portion, annular cartridge seat means having first and second ends, said seat means supported in said tank by said plate, said first ends of said seat means spaced from said plate toward said first end portion of said tank, and a replaceable annular filter cartridge having first and second ends, means mounting said cartridge coaxially on said first end of said seat means, the improvement comprising:

a cartridge receiver having first and second ends, said second end of said cartridge receiver mounted on said first end of said seat means, and said receiver having a cam slot open at said first end of said receiver and angled toward said mounting means; and
a mounting assembly engageable with said cartridge receiver on said second end of said filter cartridge, said assembly comprising a tube fixedly mounted on said cartridge coaxially therewith; a sleeve slidably mounted on said tube; means for preventing rotational movement of said sleeve relative to said cartridge; a cam follower pin projecting outwardly from the side of said sleeve, said pin adapted to follow said cam slot when said sleeve and said cartridge are rotated; and resilient means normally biasing said sleeve toward said first end of said cartridge.

12. The apparatus as defined in claim 11 wherein said cam slot includes a retention portion angled away from said mounting means.

13. The apparatus as defined in claim 12 wherein said mounting assembly further includes a spring retainer ring fixedly mounted on said tube, and positioned so that said sleeve is slidable between said retainer ring and said cartridge, and wherein said resilient means comprises a helical spring positioned between said sleeve and said tube and abutting said spring retainer ring.

14. The apparatus as defined in claim 13 wherein said cartridge receiver is annular in shape and flared outwardly at said first end.

15. The apparatus as defined in claim 14 further including a gasket mounted on said spring retainer ring opposite said spring, said gasket adapted to form a seal with said seat means when said mounting assembly engages said cartridge receiver.

16. In a filter tank having first and second end portions, an internal plate mounted in said second end portion, annular cartridge seat means having first and second ends, said seat means supported in said tank by said plate, said first ends of said seat means spaced from said plate toward said first end portion of said tank, and a replaceable annular filter cartridge having first and second ends, means mounting said cartridge coaxially on said first end of said seat means, the improvement comprising:

an annular cartridge receiver having first and second ends, said second end of said cartridge receiver shield mounted on said first end of said seat means, and said cartridge receiver having a pair of identical, oppositely disposed cam slots, said slots being open at said first end of said receiver and angled toward said mounting means, and including a retention portion angled away from said mounting means; and
a mounting assembly engageable with said cartridge receiver shield on said second end of said cartridge, said assembly comprising a tube fixedly mounted on said cartridge coaxially therewith; a spring retainer ring fixedly mounted on said tube; a sleeve slidably mounted on said tube between said spring retainer ring and said cartridge; means for preventing rotational movement of said sleeve relative to said cartridge; a pair of aligned, oppositely disposed cam follower pins projecting outwardly from the side of said sleeve, said pins adapted to follow said cam slots when said sleeve and said cartridge are rotated; a helical spring positioned between said sleeve and said tube, said spring abutting said spring retainer ring and biasing said sleeve away from said spring retainer ring and toward said first end of said cartridge; and a gasket mounted on said spring retainer ring opposite said spring, said gasket adapted to form a seal with said first end of said seat means when said mounting assembly engages said cartridge receiver shield.

17. The apparatus as defined in claim 16 wherein said first end of said filter cartridge includes a wrenching projection fixedly mounted thereon.

References Cited
UNITED STATES PATENTS

| | | | |
|---|---|---|---|
| 730,485 | 6/1903 | Simoneton | 210—323 |
| 3,272,340 | 9/1966 | Hungerford, Jr. | 210—232 |
| 3,279,608 | 10/1966 | Soriente et al. | 210—232 |

SAMIH N. ZAHARNA, Primary Examiner

U.S. Cl. X.R.

210—323